United States Patent
Pichaimurthy et al.

(10) Patent No.: US 11,308,096 B2
(45) Date of Patent: Apr. 19, 2022

(54) BIAS QUOTIENT MEASUREMENT AND DEBIASING FOR RECOMMENDATION ENGINES

(71) Applicant: Rovi Guides, Inc., San Jose, CA (US)

(72) Inventors: Rajendran Pichaimurthy, Bangalore (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 271 days.

(21) Appl. No.: 16/370,181

(22) Filed: Mar. 29, 2019

(65) Prior Publication Data

US 2020/0311090 A1 Oct. 1, 2020

(51) Int. Cl.
*G06F 16/2457* (2019.01)
*G06F 16/9535* (2019.01)
*G06F 16/248* (2019.01)

(52) U.S. Cl.
CPC ...... *G06F 16/24578* (2019.01); *G06F 16/248* (2019.01); *G06F 16/9535* (2019.01)

(58) Field of Classification Search
CPC .......... G06F 16/24578; G06F 16/9535; G06F 16/248
See application file for complete search history.

(56) References Cited

U.S. PATENT DOCUMENTS

| | | |
|---|---|---|
| 7,761,892 B2 | 7/2010 | Ellis et al. |
| 8,838,583 B1 | 9/2014 | Fox |
| 9,774,913 B1 | 9/2017 | Thomas et al. |
| 2004/0261021 A1* | 12/2004 | Mittal ............... G06F 16/24522 707/E17.058 |
| 2014/0379708 A1* | 12/2014 | Fox .................... G06F 16/24578 707/728 |
| 2015/0248481 A1* | 9/2015 | Sundaresan ....... G06F 16/24578 707/723 |

FOREIGN PATENT DOCUMENTS

EP 1 906 316 4/2008

OTHER PUBLICATIONS

International Search Report and Written Opinion of PCT/2020/023166 dated Jun. 8, 2020.

* cited by examiner

*Primary Examiner* — Kannan Shanmugasundaram
(74) *Attorney, Agent, or Firm* — Haley Guiliano LLP

(57) ABSTRACT

Systems and methods for debiasing a recommendation engine are disclosed herein. A search query associated with a user profile is received at a recommendation engine. Control circuitry generates a result set of items of content based on the search query and generates a bias score for a content attribute based on the result set. The control circuitry also generates a time-averaged bias score for the content attribute based on a plurality of search queries associated with the user profile. Based on the bias score and the time-averaged bias score, the control circuitry determines whether a bias is signaled for the content attribute. Finally, the control circuitry outputs, for display via a computing device, the result set or a debiased result set based on a result of the determination of whether the bias is signaled.

20 Claims, 11 Drawing Sheets

500

| USER PROFILE IDENTIFIER (502) | SEARCH QUERY IDENTIFIER (504) | CONTENT ITEM IDENTIFIER (506) | CONTENT ITEM ATTRIBUTE (508) |
|---|---|---|---|
| USER PROFILE ID1 | SEARCH QUERY ID 1 | CONTENT ITEM ID1 | CONTENT ATTRIBUTE ID1<br>CONTENT ATTRIBUTE ID2<br>CONTENT ATTRIBUTE ID3 |
| | | CONTENT ITEM ID2 | CONTENT ATTRIBUTE ID1<br>CONTENT ATTRIBUTE ID3 |
| | SEARCH QUERY ID 2 | CONTENT ITEM ID3 | CONTENT ATTRIBUTE ID4<br>CONTENT ATTRIBUTE ID5 |
| | | CONTENT ITEM ID4 | CONTENT ATTRIBUTE ID8<br>CONTENT ATTRIBUTE ID9 |
| USER PROFILE ID2 | SEARCH QUERY ID 4 | CONTENT ITEM ID4 | CONTENT ATTRIBUTE ID8<br>CONTENT ATTRIBUTE ID9 |
| | SEARCH QUERY ID 5 | CONTENT ITEM ID5 | CONTENT ATTRIBUTE ID5<br>CONTENT ATTRIBUTE ID7<br>CONTENT ATTRIBUTE ID9 |

| USER PROFILE PERSONA TYPE | APPLICABLE CONTENT ATTRIBUTES |
|---|---|
| USER PROFILE PERSONA TYPE 1 | CONTENT ATTRIBUTE 1<br>CONTENT ATTRIBUTE 2<br>CONTENT ATTRIBUTE 3 |
| USER PROFILE PERSONA TYPE 2 | CONTENT ATTRIBUTE 4<br>CONTENT ATTRIBUTE 5<br>CONTENT ATTRIBUTE 6 |
| USER PROFILE PERSONA TYPE 3 | CONTENT ATTRIBUTE 7<br>CONTENT ATTRIBUTE 8<br>CONTENT ATTRIBUTE 9 |

1002 — USER PROFILE PERSONA TYPE
1004 — APPLICABLE CONTENT ATTRIBUTES

| CONTENT ATTRIBUTE IDENTIFIER | UNCORRELATED, ORTHOGONAL, COMPLEMENTARY CONTENT ATTRIBUTES |
|---|---|
| CONTENT ATTRIBUTE ID1 | CONTENT ATTRIBUTE ID6 |
| CONTENT ATTRIBUTE ID2 | CONTENT ATTRIBUTE ID7 |
| CONTENT ATTRIBUTE ID3 | CONTENT ATTRIBUTE ID8 |
| CONTENT ATTRIBUTE ID4 | CONTENT ATTRIBUTE ID9 |
| CONTENT ATTRIBUTE ID5 | CONTENT ATTRIBUTE ID10 |

1102 — CONTENT ATTRIBUTE IDENTIFIER
1104 — UNCORRELATED, ORTHOGONAL, COMPLEMENTARY CONTENT ATTRIBUTES

FIG. 11

| USER PROFILE IDENTIFIER | SEARCH QUERY IDENTIFIER | CONTENT ITEM IDENTIFIER | CONTENT ITEM ATTRIBUTE |
|---|---|---|---|
| USER PROFILE ID1 | SEARCH QUERY ID 1 | CONTENT ITEM ID1 | CONTENT ATTRIBUTE ID1<br>CONTENT ATTRIBUTE ID2<br>CONTENT ATTRIBUTE ID3 |
| | | CONTENT ITEM ID2 | CONTENT ATTRIBUTE ID1<br>CONTENT ATTRIBUTE ID3 |
| | | CONTENT ITEM ID3 | CONTENT ATTRIBUTE ID4<br>CONTENT ATTRIBUTE ID5 |
| | | CONTENT ITEM ID4 | CONTENT ATTRIBUTE ID8<br>CONTENT ATTRIBUTE ID9 |
| | | CONTENT ITEM ID5 | CONTENT ATTRIBUTE ID8<br>CONTENT ATTRIBUTE ID9 |
| | | CONTENT ITEM ID6 | CONTENT ATTRIBUTE ID5<br>CONTENT ATTRIBUTE ID7<br>CONTENT ATTRIBUTE ID9 |

FIG. 12

BIAS QUOTIENT MEASUREMENT AND DEBIASING FOR RECOMMENDATION ENGINES

BACKGROUND

The present disclosure relates to systems for generating content search results and recommendations and, more particularly, to systems and related processes for detecting bias in search and recommendation results generated by a search and recommendation engine and generating debiased results.

SUMMARY

Over a period of time, search and recommendation engines often develop a degree of bias towards recommending content with certain attributes, owing to a variety of factors, such as user acceptance of their content recommendations. While user acceptance of content recommendations may be an indication of the success of internal algorithms of search and recommendation engines, it may also indirectly tend to strongly bias the algorithms toward recommending content having particular attributes and thus cause the user to consume content having particular attributes, such as content in a specific genre or area, to the exclusion of other types of content. For example, once a child begins watching content featuring a specific character, subsequent recommendations may be generated based on the child having viewed the content featuring that specific character. Those subsequent recommendations, centered around this character, however, tend to strongly bias the child toward consuming content of a particular genre or featuring particular characters, to the exclusion of other content. It would therefore be beneficial, for instance for improved viewer experience enrichment or development, to detect and compensate for bias in search and recommendation results, to provide content recommendations that do not bias viewers towards particular types of content but rather expose the viewers to a wider variety of content.

In view of the foregoing, the present disclosure provides systems and related methods that debias search and recommendation engines to mitigate or avoid the effects of bias. For instance, one such system includes a recommendation engine having control circuitry configured to receive a search query associated with a user profile. The control circuitry is configured to generate a result set of items of content based on the search query and generate a bias score for a content attribute based on the result set. Example types of content attributes include a genre, a character, an actor, an event, a theme, a language, a release date, a producer, a director, or a writer associated with an item of content. The control circuitry may generate the bias score, for example, by computing a quotient based on a number of the items of content in the result set having an attribute and a total number of the items of content in the result set. In such an example, the control circuitry may be configured to determine whether the bias is signaled for the content attribute by determining whether the quotient exceeds a threshold quotient stored in memory.

The control circuitry is also configured to generate a time-averaged bias score (sometimes referred to herein as a bias quotient) for the content attribute based on a plurality of search queries associated with the user profile. For example, the control circuitry may be configured to generate the time-averaged bias score by receiving a plurality of search queries at the recommendation engine and, for each of the plurality of search queries, generating a respective result set of items of content and generating a respective bias score based on the respective result set. The control circuitry then computes an average of the plurality of respective bias scores generated for the plurality of search queries over a period of time. Based on the bias score generated based on the result set and the time-averaged bias score based on the plurality of search queries, the control circuitry determines whether a bias is signaled for the content attribute. Finally, the control circuitry outputs, for display via a computing device, the result set or a debiased result set based on a result of the determination of whether the bias is signaled.

In some examples, the control circuitry is further configured to, in response to a determination that the bias is signaled, determine whether the bias is correlated with the user profile and, in response to a determination that the bias is correlated with the user profile, modify the result set to generate the debiased result set and output the debiased result set for display via the computing device. For instance, the result set may be modified to generate the debiased result set by adding to the result set an item of content that is uncorrelated with the signaled bias, such as an item of content that is orthogonal or complementary to the signaled bias but is still applicable to the user profile.

The system, in one aspect, further includes a memory that stores a rule indicating a type of user profile persona and a content attribute applicable to the type of user profile persona. In such an aspect, the control circuitry is configured to determine whether the user profile associated with the search query corresponds to the stored type of user profile persona and, in response to determining that the user profile associated with the search query corresponds to the stored type of user profile persona, determine whether the item of content to be added to the result set is applicable to the user profile persona based on the stored rule.

In still another aspect, the system stores in the memory a rule identifying a content attribute that is orthogonal or complementary to the content attribute for which the bias score was generated. In such an aspect, the control circuitry is configured to identify, as the item of content to be added to the result set, the item of content having the content attribute that the stored rule indicates is orthogonal or complementary to the content attribute.

The control circuitry, in a further example, is configured to, in response to a determination that the bias is signaled, determine whether the bias is correlated with the user profile and, in response to a determination that the bias is uncorrelated with the user profile, output the result set for display via the computing device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 depicts an illustrative data structure for a set of search results, in accordance with some embodiments of the disclosure;

FIG. 10 depicts an illustrative data structure of rules that indicate content attributes that are applicable to user profile persona types, in accordance with some embodiments of the disclosure;

FIG. 11 depicts an illustrative data structure of rules that indicate uncorrelated, orthogonal, and/or complementary relationships between content attributes, in accordance with some embodiments of the disclosure; and FIG. 12 depicts an illustrative data structure for a debiased set of search results, in accordance with some embodiments of the disclosure.

DETAILED DESCRIPTION

Figure 1:
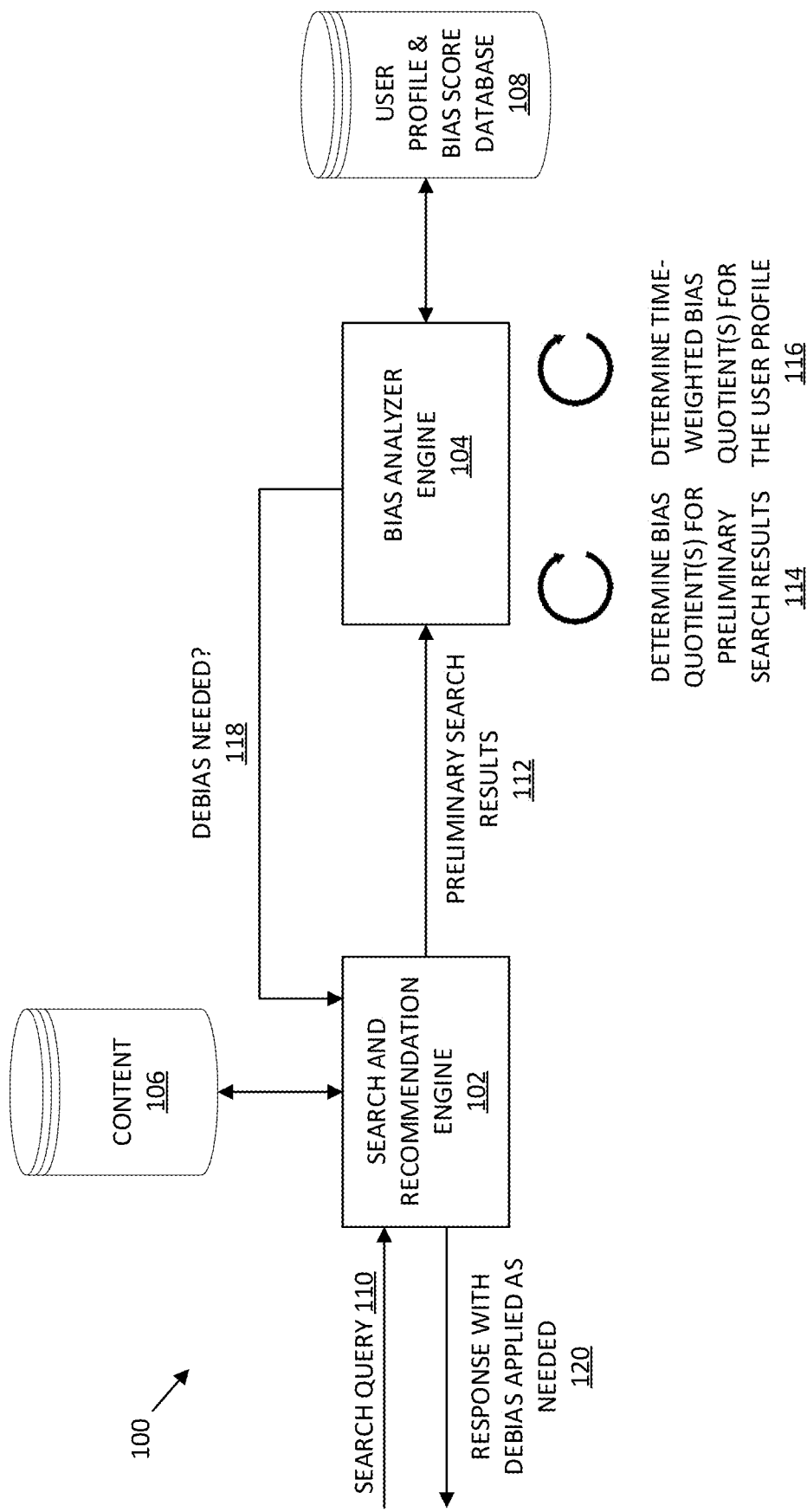
FIG. 1 shows an illustrative block diagram of a system for detecting bias in search results from a recommendation engine and generating a debiased set of results, in accordance with some embodiments of the disclosure.

FIG. 1 shows an illustrative block diagram of system 100 for detecting bias in search results from a recommendation engine and generating a debiased set of results, in accordance with some embodiments of the disclosure. System 100 includes search and recommendation engine 102 (also referred to herein as recommendation engine), bias analyzer engine 104, media content source 106, and user profile and bias score database 108. Recommendation engine 102 is communicatively coupled to bias analyzer engine 104 by way of one or more communication paths, and bias analyzer engine 104 is communicatively coupled to content source 106 and user profile and bias score database 108 by way of one or more additional communication paths. Recommendation engine 102 receives a search query 110 from a user device (not shown in FIG. 1), for instance by way of a communication network such as the Internet. The search query 110 includes one or more search query parameters, such as content attributes, and requests a set of results listing content items that satisfy the search query parameters, for instance by having such content attributes. In response to receiving the search query 110, recommendation engine 102 generates a preliminary set of search results 112 and provides those results 112 to bias analyzer engine 104.

Although the present disclosure is provided in the context of a search query inputted by a user, this is by way of example, and other embodiments are envisioned as well within the scope of this disclosure. For instance, rather than recommendation engine 102 generating search results in response to a search query inputted by a user, recommendation engine 102 may generate search or recommendation results based on data gathered from a user profile, user content viewing history, or any other suitable criteria.

Upon receiving the preliminary set of search results 112 from recommendation engine 102, bias analyzer engine 104 determines a bias quotient 114 for a particular content attribute (e.g., a content attribute included in the search query 110 or another content attribute of one or more items within the preliminary search results 112) based on the preliminary search results 112 and determines, or retrieves from user profile and bias score database 108, a time-averaged bias score 116 for the content attribute based on multiple search queries associated with the user profile. Based on a variety of factors—such as the bias quotient 114, the time-averaged bias score 116 for the content attribute, data from the user profile, or the like—bias analyzer engine 104 determines whether bias is signaled in the preliminary search results 112. If no bias is signaled in the preliminary search results 112, then bias analyzer engine 104 sends a message to recommendation engine 102, causing recommendation engine 102 to provide the preliminary search results 112 as the final response 120 to the search query 110. If, on the other hand, bias is signaled in the preliminary search results 112, then bias analyzer engine 104 sends a message to recommendation engine 102 causing recommendation engine 102 to modify the preliminary search results 112 by generating a debiased set of search results, in the manner described in further detail below. Recommendation engine 102 then provides the debiased search results instead of the preliminary search results 112 as the final response 120 to the search query 110.

Figure 2:
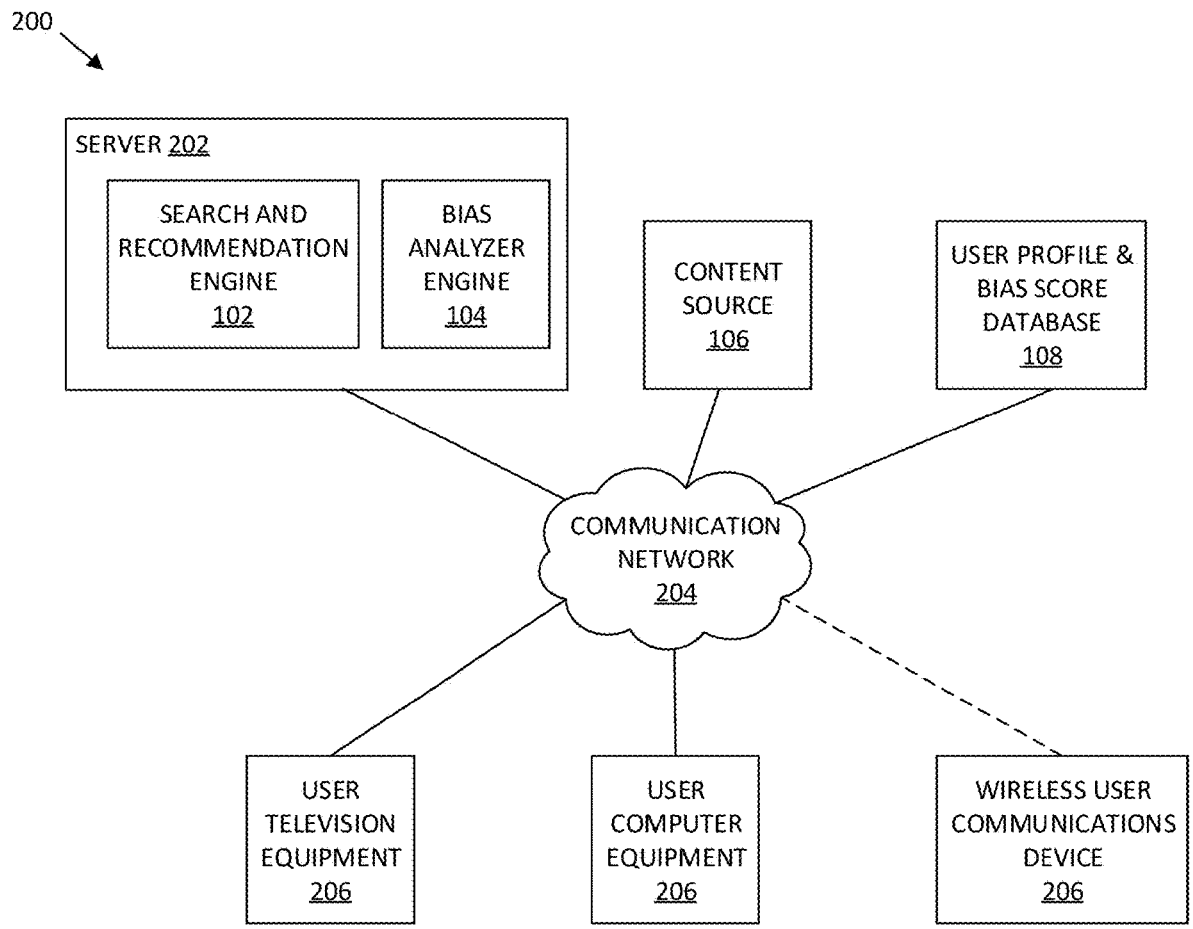
FIG. 2 is an illustrative block diagram showing additional details of the system of FIG. 1, in accordance with some embodiments of the disclosure.

FIG. 2 is an illustrative block diagram showing system 200 for detecting bias in search results from a recommendation engine and generating a debiased set of results, in accordance with some embodiments of the disclosure. In some embodiments, system 200 of FIG. 2 further represents system 100 of FIG. 1. In various aspects, system 200 includes one or more of server 202 (which includes search and recommendation engine 102 and bias analyzer engine 104 in some embodiments), content source 106, user profile and bias score database 108, communication network 204, and one or more computing devices 206, such as user television equipment (e.g., a set-top box), user computer equipment, and/or wireless user communications device (e.g., a smartphone). Although FIG. 2 shows one of each component, in various examples, system 200 may include fewer than the illustrated components and/or multiples of one or more illustrated components. Communication network 204 may be any type of communication network, such as the Internet, a mobile phone network, mobile voice or data network (e.g., a 4G or LTE network), cable network, public switched telephone network, or any combination of two or more of such communication networks. Communication network 204 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 204 communicatively couples various components of system 200 to one another. For instance, server 202 may be communicatively coupled to content source 106, user profile and bias score database 108, and/or computing device 206 via communication network 204.

In some examples, content source 106 and user profile and bias score database 108 may be integrated as one device. Content source 106 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 106 may be the originator of content (e.g., a television broadcaster, a Webcast provider, etc.) or may not be the originator of content (e.g., an on-demand content provider, an Internet provider of content of broadcast programs for downloading, etc.). Content source 106 may include cable sources, satellite providers, on-demand providers, Internet providers, over-the-top content providers, or other providers of content. Content source 106 may also include a remote media server used to store different types of content (e.g., including video content selected by a user) in a location remote from computing device 206. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Content source 106 may provide content, metadata, and/or search query results, and/or recommendation results to computing device 206 and/or server 202 using any suitable approach. In some embodiments, content or other data from content source 106 may be provided to computing device 206 using a client/server approach. In such examples, computing device 206 may pull content and/or media guidance data from server 202 and/or server 202 may push content to computing device 206. Additionally, although FIG. 2 shows content source 106 and user profile and bias score database 108 as separate from server 202, in some embodiments, content source 106 and/or user profile and bias score database 108 may be integrated as one device with server 202.

Content delivered to computing device 206 may be over-the-top (OTT) content. OTT content delivery allows Internet-enabled user devices, such as computing device 206, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. YouTube is a trademark owned by Google LLC; Netflix is a trademark owned by Netflix, Inc.; and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 206.

Figure 3:
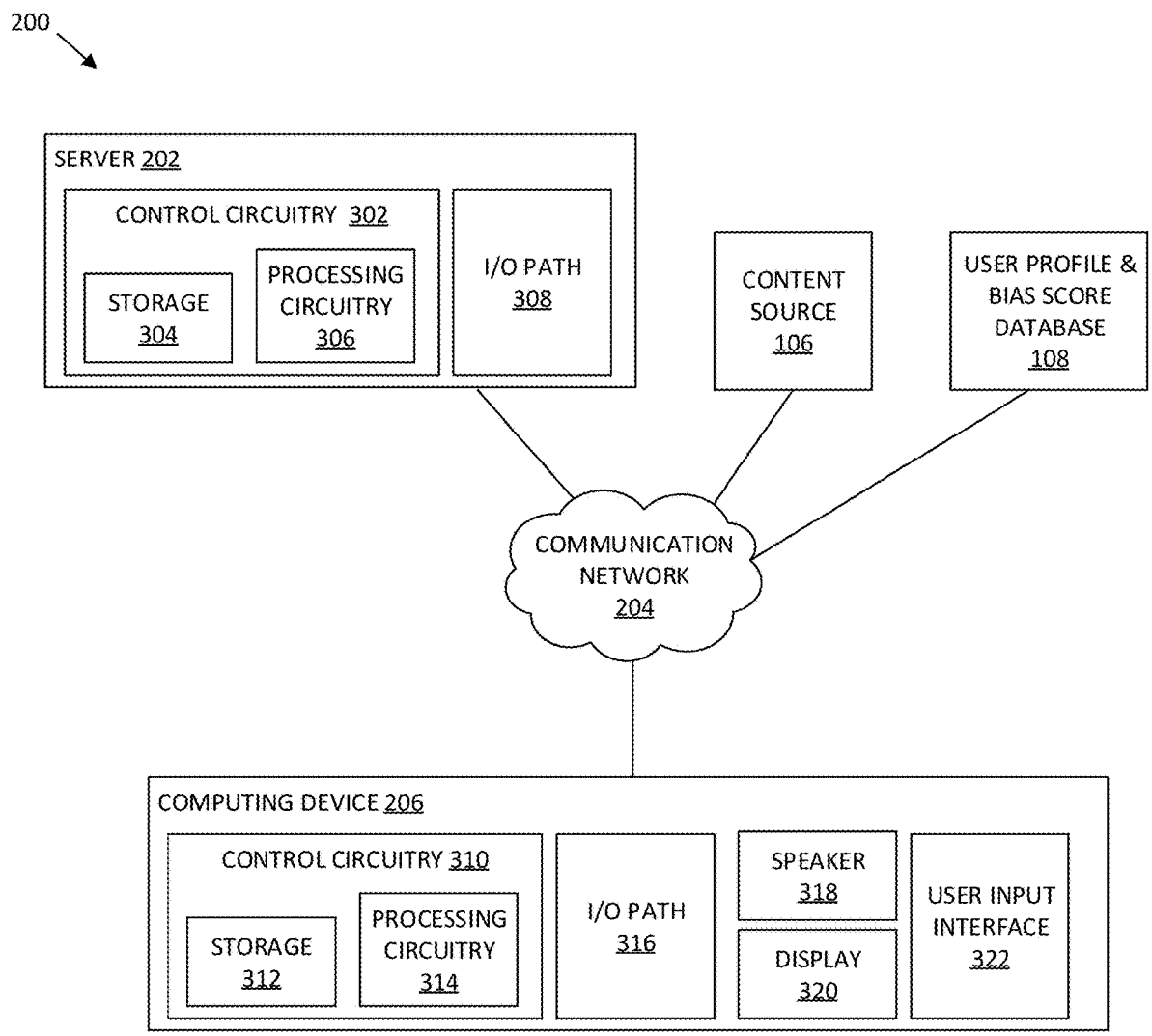
FIG. 3 is an illustrative block diagram showing additional details of the system of FIG. 1, in accordance with some embodiments of the disclosure.

FIG. 3 is an illustrative block diagram showing additional details of the system 200 of FIG. 2, in accordance with some embodiments of the disclosure. In particular, server 202 includes control circuitry 302 and I/O path 308, and control circuitry 302 includes storage 304 and processing circuitry 306. Computing device 206 includes control circuitry 310, I/O path 316, speaker 318, display 320, and user input interface 322. Control circuitry 310 includes storage 312 and processing circuitry 314. Control circuitry 302 and/or 310 may be based on any suitable processing circuitry such as processing circuitry 306 and/or 314. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 304, storage 312, and/or storages of other components of system 200 (e.g., storages of content source 106 or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 304, storage 312, and/or storages of other components of system 200 may be used to store various types of content, media guidance data, and or other types of data. Non-volatile memory may also be used (e.g., to launch a boot-up routine and other instructions). Cloud-based storage may be used to supplement storages 304, 312 or instead of storages 314, 312. In some embodiments, control circuitry 302 and/or 310 executes instructions for an application stored in memory (e.g., storage 304 and/or 312). Specifically, control circuitry 302 and/or 310 may be instructed by the application to perform the functions discussed herein. In some implementations, any action performed by control circuitry 302 and/or 310 may be based on instructions received from the application. For example, the application may be implemented as software or a set of executable instructions that may be stored in storage 304 and/or 312 and executed by control circuitry 302 and/or 310. In some embodiments, the application may be a client/server application where only a client application resides on computing device 206, and a server application resides on server 202.

The application may be implemented using any suitable architecture. For example, it may be a stand-alone application wholly implemented on computing device 206. In such an approach, instructions for the application are stored locally (e.g., in storage 312), and data for use by the application is downloaded on a periodic basis (e.g., from an out-of-band feed, from an Internet resource, or using another suitable approach). Processing circuitry 314 may retrieve instructions for the application from storage 312 and process the instructions to perform the functionality described herein. Based on the processed instructions, control circuitry 314 may determine what action to perform when input is received from user input interface 322.

In client/server-based embodiments, control circuitry 310 may include communication circuitry suitable for communicating with an application server (e.g., server 202) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 204). In another example of a client/server-based application, control circuitry 310 runs a web browser that interprets web pages provided by a remote server (e.g., server 202). For example, the remote server may store the instructions for the application in a storage device. The remote server may process the stored instructions using circuitry (e.g., control circuitry 302) and generate the displays discussed above and below. Computing device 206 may receive the displays generated by the remote server and may display the content of the displays locally via display 320. This way, the processing of the instructions is performed remotely (e.g., by server 202) while the resulting displays, such as the display windows described elsewhere herein, are provided locally on computing device 206. Computing device 206 may receive inputs from the user via input interface 322 and transmit those inputs to the remote server for processing and generating the corresponding displays.

A user may send instructions to control circuitry 302 and/or 310 using user input interface 322. User input interface 322 may be any suitable user interface, such as a remote control, trackball, keypad, keyboard, touchscreen, touchpad, stylus input, joystick, voice recognition interface, or other user input interfaces. User input interface 322 may be integrated with or combined with display 320, which may be a monitor, a television, a liquid crystal display (LCD), electronic ink display, or any other equipment suitable for displaying visual images.

Server 202 and computing device 206 may receive content and data via input/output (hereinafter "I/O") paths 308 and 316, respectively. For instance, I/O path 316 may include a communication port configured to receive a live content stream from server 202 and/or content source 106 via a communication network 204. Storage 312 may be configured to buffer the received live content stream for playback, and display 320 may be configured to present the buffered content, navigation options, alerts, and/or the like via a primary display window and/or a secondary display window. I/O paths 308, 316 may provide content (e.g., a live stream of content, broadcast programming, on-demand programming, Internet content, content available over a local area network (LAN) or wide area network (WAN), and/or other content) and data to control circuitry 302, 310. Control circuitry 302, 310 may be used to send and receive commands, requests, and other suitable data using I/O paths 308, 316. I/O paths 308, 316 may connect control circuitry 302, 310 (and specifically processing circuitry 306, 314) to one or more communication paths (described below). I/O functions may be provided by one or more of these communication paths but are shown as single paths in FIG. 3 to avoid overcomplicating the drawing.

Figure 4:
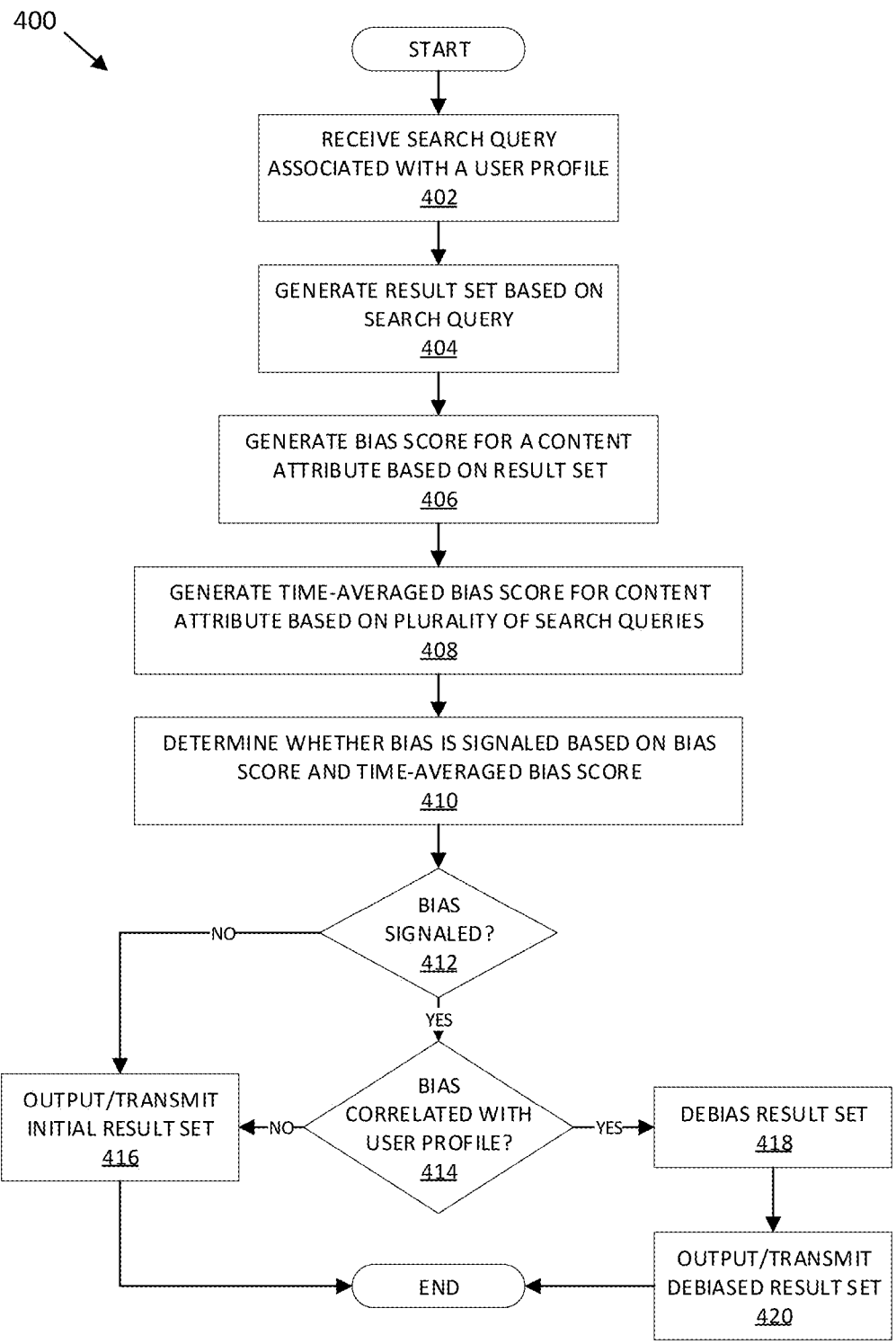
FIG. 4 is an illustrative flowchart of a process for detecting bias in search results from the recommendation engine and generating a debiased set of results, in accordance with some embodiments of the disclosure.

Having described systems 100 and 200, reference is now made to FIG. 4, which depicts an illustrative flowchart of process 400 for detecting bias in search results from a recommendation engine and generating a debiased set of results that may be implemented by using systems 100 and/or 200, in accordance with some embodiments of the disclosure. In various embodiments, individual steps of process 400 may be implemented by one or more components of systems 100 and/or 200. Although the present disclosure may describe certain steps of process 400 (and of other processes described herein) as being implemented by certain components of systems 100 and/or 200, this is for purposes of illustration only, and it should be understood that other components of systems 100 and/or 200 may implement those steps instead.

At 402, control circuitry 302 receives, from computing device 206 over communication network 204, a search query associated with a user profile. At 404, control circuitry 302 generates a preliminary result set identifying content items based on the search query (e.g., based on one or more search query parameters included in the search query) received at 404. Control circuitry 302 may generate the preliminary result set in any suitable manner. FIG. 5 depicts an illustrative data structure 500 for a set of search results, such as the set of search results that may be generated and/or stored at 404, in accordance with some embodiments of the disclosure. The data structure 500 includes fields for a user profile identifier 502, search query identifier 504, content item identifier 506, and content item attribute 508. The user profile identifier 502 uniquely identifies a user profile associated with one or more search queries, such as search queries identified by search query identifiers 504. For each search query identifier 504, the data structure 500 indicates one or more identifiers 506 of content items (e.g., videos, songs, movies, or the like) that were identified based on the search query. For each content item identifier 506, the data structure 500 indicates one or more identifiers 508 of content item attributes (e.g., genre, language, character, release date, or any other type of content attribute) that are associated with content items.

Referring back to FIG. 4, at 406, control circuitry 302 generates a bias score for a content attribute (or generates multiple bias scores for multiple attributes, respectively) based on the result set generated at 404. For instance, control circuitry 302 may process the preliminary result set generated at 404 to determine all the content attributes of the items of content included in the preliminary result set and then compute a bias score for each such content attribute to determine whether the preliminary search results signal respective biases for each content attribute. Additional details regarding how control circuitry 302 may generate the bias score at 406 are provided below in the context of FIG. 6.

At 408, control circuitry 302 generates a time-averaged bias score for the content attribute (or generates respective time-averaged bias scores for multiple content attributes) based on a plurality of search queries, such as search queries received and responded to by control circuitry 302 over a predetermined and/or configurable period of time. As described in further detail below, in one example control circuitry 302 utilizes the time-averaged bias score(s) to determine whether the bias score generated at 406 signals a bias in the preliminary search results generated at 404. Additional details regarding how control circuitry 302 may generate the time-averaged bias score at 408 are provided below in the context of FIG. 6.

At 410, control circuitry 302 determines whether a bias is signaled, as to the content attribute in question, based on the bias score generated at 406 and the time-averaged bias score generated at 408 for that content attribute. Additional details regarding how control circuitry 302 may determines whether a bias is signaled as to the content attribute in question at 410 are provided below in the context of FIG. 8. If control circuitry 302 determines that no bias is signaled ("NO" at 412), then at 416 control circuitry 302 outputs and/or transmits to computing device 206, over communication network 204, the preliminary result set generated at 404 in response to the search query. If, on the other hand, control circuitry 302 determines that a bias is signaled ("YES" at 412), then control passes to 414.

At 414, control circuitry 302 determines whether the signaled bias is correlated with the user profile associated with the search query received at 402. Control circuitry 302 may make the determination at 414 in any suitable manner. For instance, if the bias is signaled for a particular content attribute, control circuitry 302 may analyze the user profile to determine whether the user profile includes an indication of a user's affinity (e.g., as indicated by a user's content viewing history) for content having the content attribute in question. If the user profile indicates that the user does have an affinity for such content (e.g., as indicated if the user's content viewing history shows that the user views content having such an attribute more than a predetermined threshold percentage as compared to content not having such an attribute), then that indicates that the signaled bias is correlated with the user profile. If the user profile indicates that the user does not have an affinity for such content, then that indicates that the signaled bias is not correlated with the user profile. If control circuitry 302 determines that the signaled bias is not correlated with the user profile associated with the search query ("NO" at 414), then at 416 control circuitry 302 outputs and/or transmits to computing device 206, over communication network 204, the preliminary result set generated at 404 in response to the search query. If, on the other hand, control circuitry 302 determines that the signaled bias is correlated with the user profile associated with the search query ("YES" at 414), then control passes to 418.

At 418, control circuitry 302 generates a debiased search result set to compensate for the bias. Additional details regarding how control circuitry 302 may generates a debiased search result set at 418 are provided below in the context of FIG. 9. At 420, control circuitry 302 outputs and/or transmits to computing device 206 over communication network 204, the debiased result set generated at 418, instead of the preliminary result set generated at 404, in response to the search query.

Figure 6:
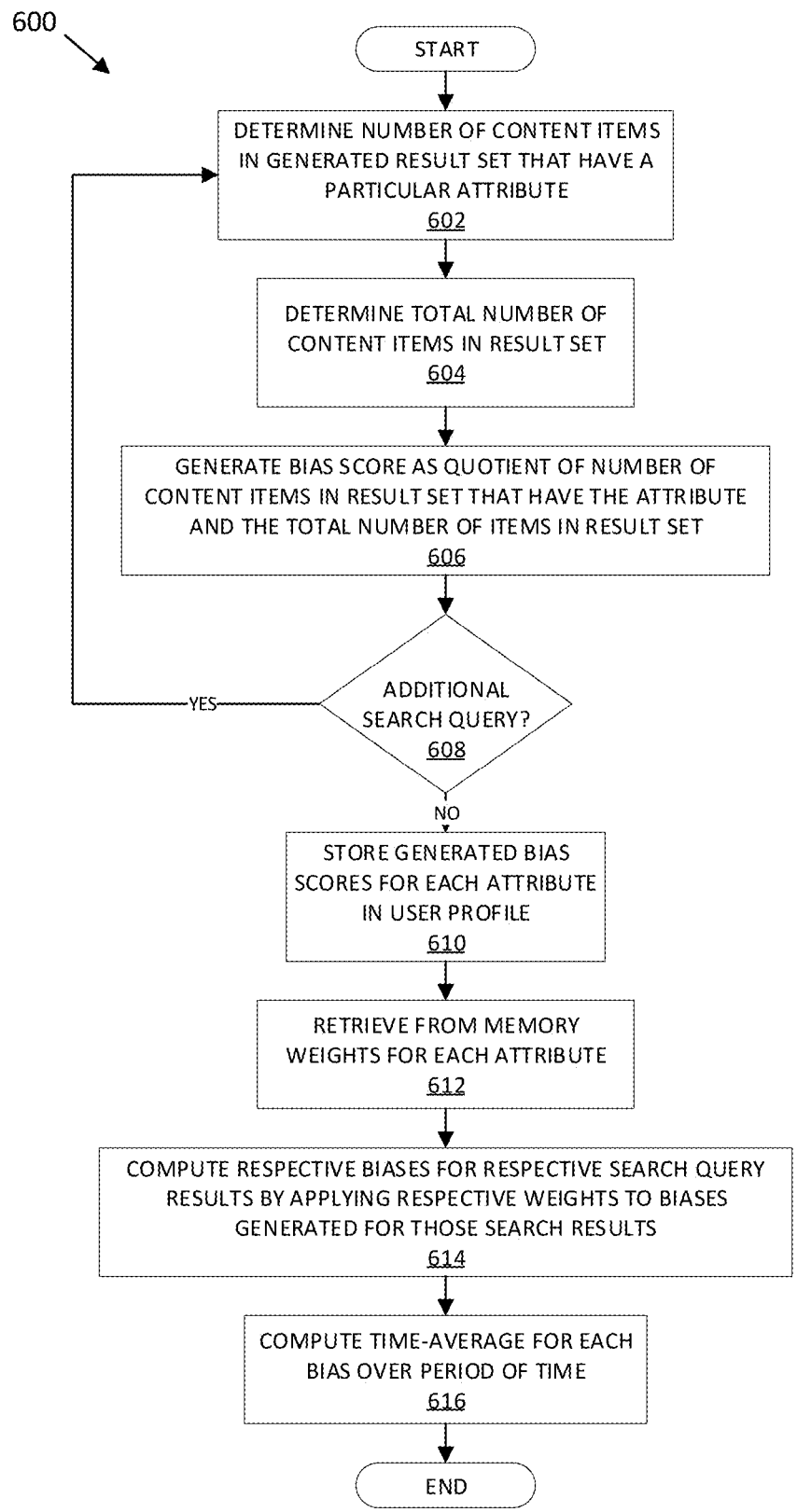
FIG. 6 is an illustrative flowchart of a process for generating a content attribute time-averaged bias score, in accordance with some embodiments of the disclosure.

FIG. 6 is an illustrative flowchart of a process 600 for generating a content attribute time-averaged bias score, in accordance with some embodiments of the disclosure. Process 600, in some embodiments, further describes the functionality of 408 of FIG. 4. At 602, control circuitry 302 determines a number of content items listed in the preliminary search results generated at 404 that have a particular content attribute, for instance as indicated by content attribute identifiers 508. At 604, control circuitry 302 determines a total number of content items listed in the preliminary search results generated at 404, regardless of their content attributes. At 606, control circuitry 302 generates a bias score as a quotient of the number of content items listed in the preliminary search results generated at 404 that have the particular content attribute, determined at 602, and the total number of content items listed in the preliminary search results generated at 404, determined at 604. At 608, control circuitry 302 determines whether an additional search query has been entered (e.g., historical search queries processed within a predetermined period of past time in connection with the user account) and is to be included in computation of a time-averaged bias score for the content attribute for the user profile. If an additional search query is to be included in computation of a time-averaged bias score for the content attribute for the user profile ("YES" at 608), then control passes back to block 602 to process the additional search query in the manner described above. If no additional search query remains to be included in computation of a time-averaged bias score for the content attribute for the user profile ("NO" at 608), then control passes to 610.

Figure 7:
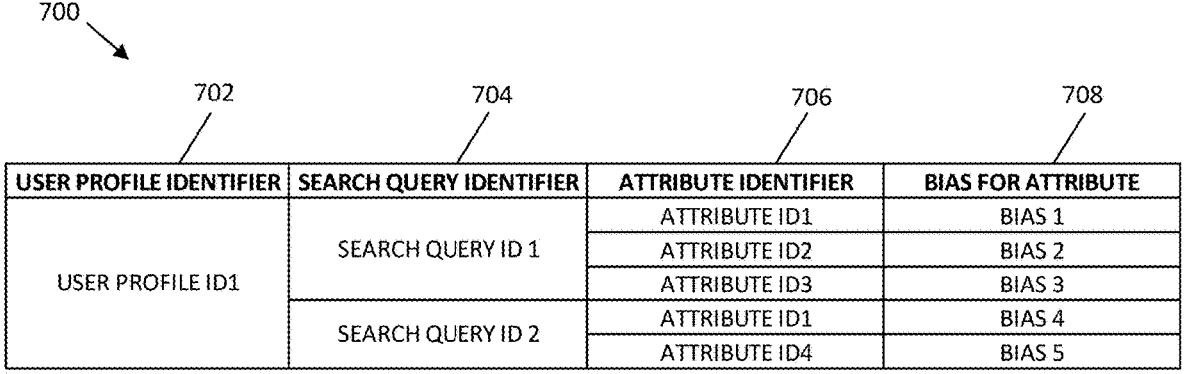
FIG. 7 depicts an illustrative data structure of a user profile including attribute bias scores, in accordance with some embodiments of the disclosure.

At 610, control circuitry 302 stores in user profile and bias score database 108 the bias scores generated for each attribute in the user profile. FIG. 7 depicts an illustrative data structure 700 of a user profile including attribute bias scores, which may be stored in user profile and bias score database 108 at 610, in accordance with some embodiments of the disclosure. Data structure 700 includes fields for user profile identifiers 702, search query identifiers 704, attribute identifiers 706, and biases 708 generated for those content attributes. At 612, control circuitry 302 retrieves from memory (e.g., storage 304) weights, if any, for each content attribute. At 614, control circuitry 302 computes respective biases for respective search query results by applying the respective weights (retrieved at 612) to the biases stored at 610 for those search results. For instance, the weights may be multiplied by the biases. At 616, control circuitry computes a time-average for each bias (for each content attribute) over a period of time, which may be predetermined or configurable.

Figure 8:
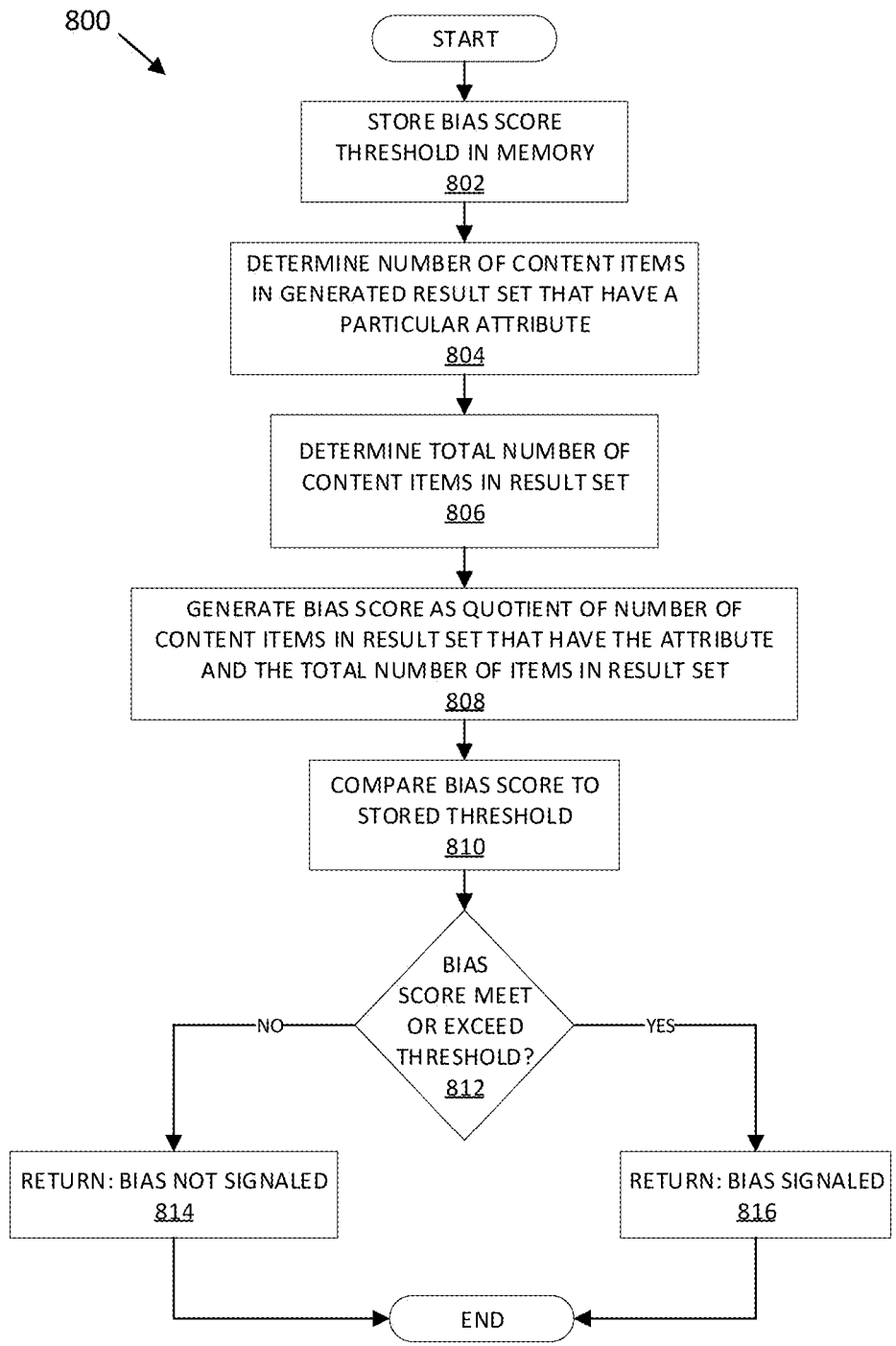
FIG. 8 is an illustrative flowchart of a process for determining whether bias is signaled in a set of search results, in accordance with some embodiments of the disclosure.

FIG. 8 is an illustrative flowchart of a process 800 for determining whether bias is signaled in a set of search results, in accordance with some embodiments of the disclosure. Process 800, in some embodiments, further describes the functionality of 410 of FIG. 4. At 802, control circuitry 302 stores a bias score threshold, which may be predetermined, fixed, or configurable, in memory (e.g., storage 304). At 804, control circuitry 302 determines a number of content items listed in the preliminary search results generated at 404 that have a particular content attribute, for instance as indicated by content attribute identifiers 508. At 806, control circuitry 302 determines a total number of content items listed in the preliminary search results generated at 404, regardless of their content attributes. At 808, control circuitry 302 generates a bias score as a quotient of the number of content items listed in the preliminary search results generated at 404 that have the particular content attribute, determined at 804, and the total number of content items listed in the preliminary search results generated at 404, determined at 806. At 810, control circuitry 302 compares the bias score generated at 808 to the bias score threshold stored in memory at 802. If the bias score generated at 808 fails to meet or exceed the bias score threshold ("NO" at 812), then at 814 control circuitry 302 returns data indicating that no bias is signaled for that content attribute. If the bias score generated at 808 meets or exceeds the bias score threshold ("YES" at 812), then at 816 control circuitry 302 returns data indicating that a bias is signaled for that content attribute.

Figure 9:
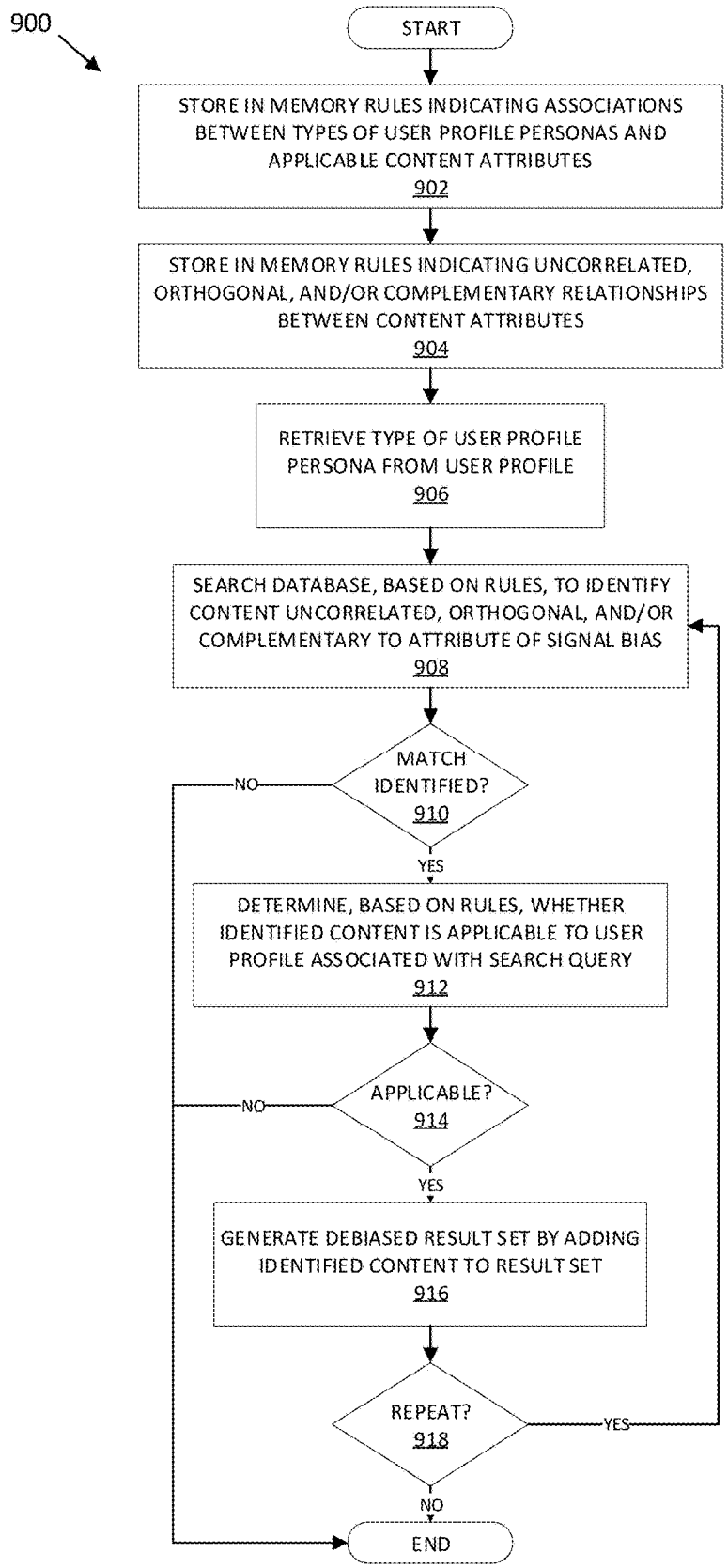
FIG. 9 is an illustrative flowchart of a process for generating a debiased search result set, in accordance with some embodiments of the disclosure.

FIG. 9 is an illustrative flowchart of a process 900 for generating a debiased search result set, in accordance with some embodiments of the disclosure. Process 900, in some embodiments, further describes the functionality of 418 of FIG. 4. At 902, control circuitry 302 stores in memory (e.g., storage 304) rules indicating associations between types of user profile personas and content attributes that are applicable to those types of user profile personas. FIG. 10 depicts an illustrative data structure 1000 of rules that indicate content attributes that are applicable to user profile persona types, which may be stored at 902, in accordance with some embodiments. The data structure 1000 includes fields for user profile persona type identifiers 1002 and content attribute identifiers 1004 that are applicable to those user profile persona type identifiers 1002. In particular, for each user profile persona type 1002 (any one or more of which may correspond to the user profile associated with the search query received at 402), the data structure 1000 indicates one or more content attributes identifiers 1004 of content attributes (e.g., genre, language, character, release date, or any other type of content attribute) that are applicable to the user profile persona type 1002. For example, the data structure 1000 may indicate that a cartoon genre is applicable to a child user profile persona type, but inapplicable to an adult user profile persona type.

At 904, control circuitry 302 stores in memory rules indicating uncorrelated, orthogonal, and/or complementary relationships between content attributes. FIG. 11 depicts an illustrative data structure 1100 of rules that indicate uncorrelated, orthogonal, and/or complementary relationships between content attributes, which may be stored at 904, in accordance with some embodiments of the disclosure. Data structure 1100 includes fields for content attribute identifiers 1102 and identifiers 1104 of content attributes that are uncorrelated with and/or orthogonal or complementary to those content attributes identified by identifiers 1102. A first content attribute may be deemed uncorrelated with and/or orthogonal or complementary to a second content attribute based on any number of factors, such as based on a lack of a minimum amount of content items in content source 106 that share both the first and second content attributes. A genre of cartoons, for instance, may be deemed uncorrelated with a genre of politics.

At 906, control circuitry 302 retrieves a type of user profile persona from the user profile associated with the search query received at 402. At 908, control circuitry 302 searches content source 106 to identify, based on the rules stored at 904, content that is uncorrelated with and/or orthogonal or complementary to the content attribute for which a bias was determined to be signaled at 412. If no content item is identified at 908 that is uncorrelated with and/or orthogonal or complementary to the content attribute for which a bias was determined to be signaled at 412 ("NO" at 910), then process 900 terminates. If one or more content items are identified that are uncorrelated with and/or orthogonal or complementary to the content attribute for which a bias was determined to be signaled at 412 ("YES" at 910), then control passes to 912.

At 912, control circuitry 302 determines, based on the rules stored at 902, whether the one or more items of content identified at 908 are applicable to the user profile persona type retrieved at 906. If none of the one or more items of content identified at 908 is applicable to the user profile persona type retrieved at 906 ("NO" at 914), then process 900 terminates. If, on the other hand, one or more of the items of content identified at 908 are applicable to the user profile persona type retrieved at 906 ("YES" at 914), then at 916 control circuitry 302 generates a debiased set of search results by adding the item of content identified at 908 and determined to be applicable at 912. At 918, control circuitry 302 determines whether any additional content attributes remain to be analyzed by repeating the processes of 908, 910, 912, 914, and 916. If such processes are to be repeated ("YES" at 918), then control passes to 908 to repeat the functionality described above, for instance for another content attribute. Otherwise, if no repetition is necessary ("NO" at 918), then process 900 terminates.

FIG. 12 depicts an illustrative data structure 1200 for a debiased set of search results, which may be generated at 418, in accordance with some embodiments of the disclosure. The data structure 1200 includes fields similar to those of the data structure 500 of FIG. 5. In particular, the data structure 1200 includes fields for a user profile identifier 1202, a search query identifier 1204, a content item identifier 1206, and content item attribute 1208. The user profile identifier 1202 uniquely identifies the user profile associated with the search query received at 402, which is identified by search query identifier 1204. The data structure 1200 also indicates one or more identifiers 1206 of content items (e.g., videos, songs, movies, or the like) that were identified based on the preliminary search query (having CONTENT ITEM ID1 and CONTENT ITEM ID2). Additionally, data structure 1200 indicates one or more identifiers 1206 of content items that were added to the preliminary result set based on the debiasing performed at 418 (having CONTENT ITEM ID3, CONTENT ITEM ID4, CONTENT ITEM ID5, and CONTENT ITEM ID6). As described in further detail elsewhere herein, those added content items are uncorrelated with, orthogonal to, and/or complementary to the content items (having CONTENT ITEM ID1 and CONTENT ITEM ID2) that were included in the preliminary search results. For each content item identifier 1206, the data structure 1200 indicates one or more identifiers 1208 of content item attributes (e.g., genre, language, character, release date, or any other type of content attribute) that are associated with content items. By adding the content items to the preliminary result set, control circuitry 302 effectively debiases the preliminary result set, providing the user who inputted the search query with a wider variety of search results than otherwise would be the case.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for debiasing a recommendation engine, comprising:
    receiving, at a recommendation engine, a search query associated with a user profile;
    generating a result set of items of content based on the search query;
    generating, based on the result set, a bias score for a content attribute;
    receiving, at the recommendation engine, a plurality of search queries associated with the user profile;
    for each of the plurality of search queries associated with the user profile:
        (i) generating a respective result set of items of content; and
        (ii) generating a respective bias score based on the respective result set;
    generating a time-averaged bias score for the content attribute based on computing an average of all the respective bias scores generated for the plurality of search queries over a period of time;

determining, based on the bias score and the time-averaged bias score, whether a bias is signaled for the content attribute; and outputting, for display via a computing device, the result set or a debiased result set based on a result of the determination of whether the bias is signaled.

2. The method of claim 1, further comprising:
in response to a determination that the bias is signaled, determining whether the bias is correlated with the user profile; and
in response to a determination that the bias is correlated with the user profile:
modifying the result set to generate the debiased result set; and
outputting, for display via the computing device, the debiased result set.

3. The method of claim 2, wherein the modifying the result set to generate the debiased result set comprises adding to the result set an item of content that is uncorrelated with the signaled bias.

4. The method of claim 3, wherein the adding to the result set the item of content that is uncorrelated with the signaled bias comprises adding to the result set an item of content that is orthogonal or complementary to the signaled bias and is applicable to the user profile.

5. The method of claim 4, further comprising:
storing, in a memory, a rule indicating a type of user profile persona and a content attribute applicable to the type of user profile persona;
determining whether the user profile associated with the search query corresponds to the stored type of user profile persona; and
in response to determining that the user profile associated with the search query corresponds to the stored type of user profile persona, determining whether the item of content to be added to the result set is applicable to the user profile persona based on the stored rule.

6. The method of claim 4, further comprising:
storing, in a memory, a rule identifying a content attribute that is orthogonal or complementary to the content attribute for which the bias score was generated; and
identifying, as the item of content to be added to the result set, the item of content having the content attribute that the stored rule indicates is orthogonal or complementary to the content attribute.

7. The method of claim 1, further comprising:
in response to a determination that the bias is signaled, determining whether the bias is correlated with the user profile; and
in response to a determination that the bias is uncorrelated with the user profile, outputting, for display via the computing device, the result set.

8. The method of claim 1, wherein generating the bias score comprises computing a quotient based on a number of the items of content in the result set having an attribute and a total number of the items of content in the result set.

9. The method of claim 8, wherein determining whether the bias is signaled for the content attribute comprises determining whether the quotient exceeds a threshold quotient stored in memory.

10. The method of claim 1, wherein the period of time is configured as a setting.

11. A system for debiasing a recommendation engine, comprising:

a communication port configured to receive, at a recommendation engine, a search query associated with a user profile and a plurality of search queries associated with the user profile;
memory configured to store instructions; and
processing circuitry configured to execute the instructions to:
generate a result set of items of content based on the search query;
generate, based on the result set, a bias score for a content attribute;
for each of the plurality of search queries associated with the user profile:
(i) generate a respective result set of items of content; and
(ii) generate a respective bias score based on the respective result set;
generate a time-averaged bias score for the content attribute based on computing an average of all the respective bias scores generated for the plurality of search queries over a period of time;
determine, based on the bias score and the time-averaged bias score, whether a bias is signaled for the content attribute; and
output, for display via a computing device, the result set or a debiased result set based on a result of the determination of whether the bias is signaled.

12. The system of claim 11, wherein the control circuitry is further configured to:
in response to a determination that the bias is signaled, determine whether the bias is correlated with the user profile; and
in response to a determination that the bias is correlated with the user profile:
modify the result set to generate the debiased result set; and
output, for display via the computing device, the debiased result set.

13. The system of claim 12, wherein the control circuitry is further configured to modify the result set to generate the debiased result set by adding to the result set an item of content that is uncorrelated with the signaled bias.

14. The system of claim 13, wherein the control circuitry is further configured to add to the result set the item of content that is uncorrelated with the signaled bias by adding to the result set an item of content that is orthogonal or complementary to the signaled bias and is applicable to the user profile.

15. The system of claim 14, wherein the control circuitry is further configured to:
store, in the memory, a rule indicating a type of user profile persona and a content attribute applicable to the type of user profile persona;
determine whether the user profile associated with the search query corresponds to the stored type of user profile persona; and
in response to determining that the user profile associated with the search query corresponds to the stored type of user profile persona, determine whether the item of content to be added to the result set is applicable to the user profile persona based on the stored rule.

16. The system of claim 14, wherein the control circuitry is further configured to:
store, in the memory, a rule identifying a content attribute that is orthogonal or complementary to the content attribute for which the bias score was generated; and identify, as the item of content to be added to the result set, the item of content having the content attribute that the stored rule indicates is orthogonal or complementary to the content attribute.

17. The system of claim 11, wherein the control circuitry is further configured to:
   in response to a determination that the bias is signaled, determine whether the bias is correlated with the user profile; and
   in response to a determination that the bias is uncorrelated with the user profile, output the result set for display via the computing device.

18. The system of claim 11, wherein the control circuitry is further configured to generate the bias score by computing a quotient based on a number of the items of content in the result set having an attribute and a total number of the items of content in the result set.

19. The system of claim 18, wherein the control circuitry is further configured to determine whether the bias is signaled for the content attribute by determining whether the quotient exceeds a threshold quotient stored in memory.

20. The system of claim 11, wherein the period of time is configured as a setting.

* * * * *